Oct. 27, 1936. W. J. TOURVILLE 2,059,063
CONVEYER
Filed April 15, 1935

INVENTOR
WILLIAM J. TOURVILLE
BY
ATTORNEYS

Patented Oct. 27, 1936

2,059,063

UNITED STATES PATENT OFFICE 2,059,063

CONVEYER

William J. Tourville, Detroit, Mich., assignor to The Detroit Steel Casting Company, Detroit, Mich., a corporation of Michigan Application April 15, 1935, Serial No. 16,489

4 Claims. (Cl. 198—195)

The invention relates to chain conveyers of that type largely used in manufacturing establishments for transporting work from one location to another. It is the object of the invention to obtain a simple construction which can be manufactured at low cost, easily assembled and easily repaired. To this end the invention consists in the construction as hereinafter set forth.

Figure 1:
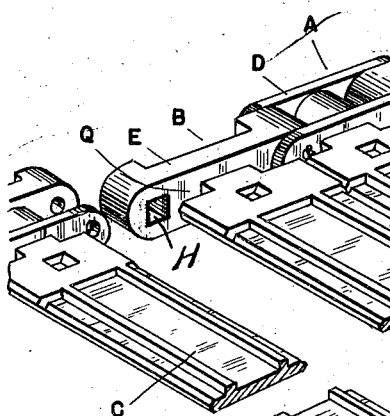
Fig. 1 is a perspective view of a small section of my improved conveyer chain showing one of the links thereof detached.
Figure 2:
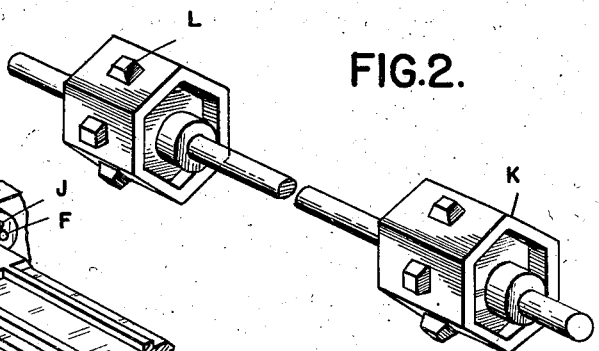
Fig. 2 is a perspective view of the wheel member for driving the chain.
Figure 3:
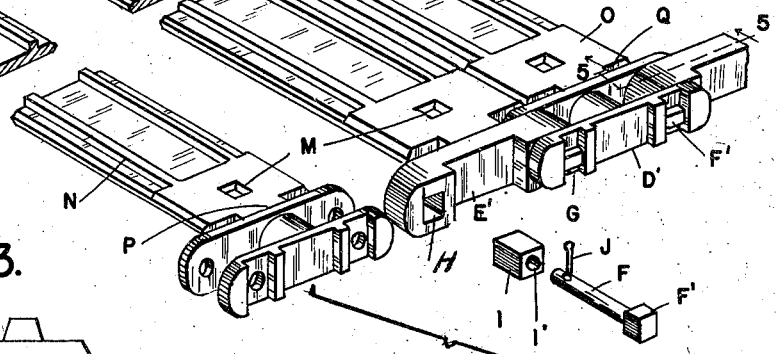
Fig. 3 is a section through the chain in engagement with the wheel.
Figure 3:
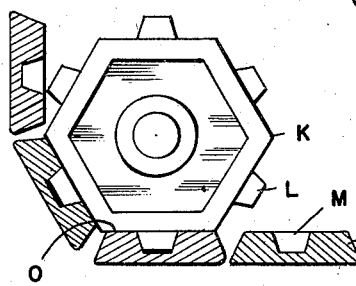
Figure 5:
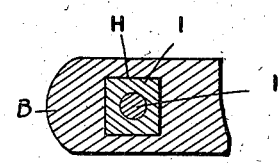
Fig. 5 is a section on line 5—5, Fig. 1.
Figure 4:
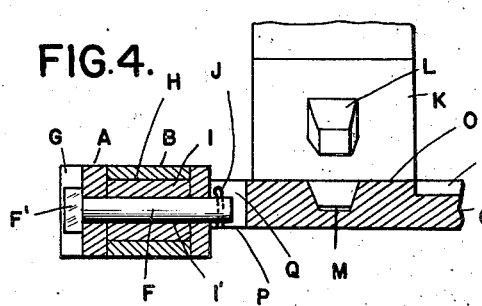
Fig. 4 is a sectional elevation thereof.

As shown in Fig. 1, my improved conveyer is formed of alternate link members A and B, each having a plate or bar section C with chain links at opposite ends thereof and integral therewith. The section A has the links D and D' thereof bifurcated to embrace the links E and E' of the adjacent section B. The links of the two sections are then pivotally connected to each other by pivot pins F.

Where conveyers of this character are continuously used, wear will occur, particularly upon the pivots and bearings therefor. This in time will produce lost motion which will lengthen the distance between centers of adjacent links, interfering with the proper engagement of the same with the sprockets over which they run and being otherwise objectionable. I have therefore devised a construction in which the wearing parts can be readily replaced and without interrupting the service of the conveyer for any considerable length of time, the construction being as follows:

The pins F pass through aligned apertures in the furcations of the bifurcated links D and D' and are held from turning by being provided with squared heads F' engaging corresponding grooves or recesses G in the links D and D'. The links E and E' have formed therein square or polygonal apertures H which are larger than the pins F and in these apertures are placed bushings I of corresponding shape and having a central cylindrical aperture I' for fitting the pin F. With this construction when the links D and E move angularly in relation to each other the pin F remains in non-rotative relation to the link D by reason of the engagement of its polygonal head F' with the recess G. In the same way a bushing I remains in non-rotative relation to the link E because of its polygonal engagement therewith. Consequently a relative rotational movement is between the pin F and the bushings I, which parts alone will wear. It will thus be understood that whenever wear in these parts is excessive they can be quickly removed and replaced by new members. The pin F is retained in position by a cotter pin J which can be quickly removed.

For driving the conveyer and for also changing its direction I have provided wheels K. These are of polygonal form with each face of a length such that when the sections A or B are in engagement therewith, the pivots F will be located at the apices or corners between polygonal sides. This will effect a driving without the use of sprocket teeth. However, to insure registration, the tapering pins L are placed on the wheel to engage corresponding recesses M in the sections A and B. These pins are merely pilots and do not receive the driving stress which is transmitted directly from the wheel to the sections bearing thereon.

The bar portions of the members A and B are preferably ribbed as indicated at N, but the portions O which engage the wheels K are flat and preferably flush with the upper faces of the ribs. These portions O lie immediately adjacent to the chain link portions to which they are centrally connected at P but have their opposite ends separated therefrom by slots Q. This gives clearance for the engagement of the overlapping portions of the links with each other and also for the pivot pins F with their cotter pins J. As each of these members A and B is rigid with the chain link portions at opposite ends thereof, it may be formed as an integral casting, or by fabrication of several parts if so desired.

What I claim as my invention is:

1. In a conveyer, a series of bar members having their edges in close proximity, each bar member having link portions at opposite ends thereof integral therewith, said link portions being of greater width than the bars to overlap links of adjacent bars and the links of alternate bars being bifurcated to embrace the links of intermediate bars, pins for pivotally connecting the overlapping portions of said links in line with the adjacent edges of said bars, each pin having a polygonal head non-rotatively engaging a recess in one of the furcations of said bifurcated link, and a polygonal bushing engaging a correspondingly shaped recess in the non-bifurcated link for directly engaging said pin.

2. In a conveyer, a series of flat bar members pivotally connected to each other, a polygonal driving wheel for said conveyer having its faces substantially corresponding in width to said flat bars and bearing thereagainst with the axes of the pivots connecting said bars in radial line with the apices of adjacent faces of said wheel, and pilot pins projecting from the faces of said polygonal wheel engaging recesses in said flat bars to insure registration of said bars with said faces with transmission of torque therethrough.

3. In a conveyer, a series of flat bar members having their edges adjacent, each member having link portions at opposite ends thereof centrally integrally connected therewith, said link portions being of greater width than the bars to overlap link portions of adjacent bars and each link portion being separated from the outer edge portions of said bars by slots therein providing clearance for the overlapping links, the links of alternate bars being bifurcated to embrace the links of intermediate bars, pins pivotally connecting said links in line with the adjacent edges of said bars, each pin having a square head for engaging a recess in one of the furcations of the bifurcated link and a polygonal bushing engaging a correspondingly shaped recess in the non-bifurcated link for directly engaging said pin.

4. In a conveyer, a series of flat bar members having ribbed central portions, portions at opposite ends thereof flush with the top surfaces of the ribs, lugs projecting centrally outward from the latter portions having links integral therewith and of a width greater than the width of said bars, the links of alternate bars being bifurcated and the links of the intermediate bars being engaged between the furcations of said bifurcated links, the latter links having polygonal shaped cored holes therein, similar shaped bushings engaging said holes, pins passing through the furcations of the bifurcated links and through the bushings of the intermediate links, said pins having polygonal heads for engaging recesses in the bifurcated links whereby said pins are held from turning the axes of said pins being aligned with the adjacent edges of said bars.

WILLIAM J. TOURVILLE.